(12) United States Patent
    Godse

(10) Patent No.: US 11,417,093 B1
(45) Date of Patent: *Aug. 16, 2022

(54) IMAGE CAPTURE WITH CONTEXT DATA OVERLAY

(71) Applicant: United Services Automobile Association (USAA), San Antonio, TX (US)

(72) Inventor: Hrishikesh Godse, Prosper, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 275 days.

This patent is subject to a terminal disclaimer.

(21) Appl. No.: 16/819,394

(22) Filed: Mar. 16, 2020

Related U.S. Application Data

(63) Continuation of application No. 16/212,006, filed on Dec. 6, 2018, now Pat. No. 10,628,674.

(60) Provisional application No. 62/596,042, filed on Dec. 7, 2017.

(51) Int. Cl.
| | |
|---|---|
| *G06V 20/20* | (2022.01) |
| *G06Q 40/02* | (2012.01) |
| *G06V 10/70* | (2022.01) |
| *G06V 30/40* | (2022.01) |
| *G06F 3/04842* | (2022.01) |

(Continued)

(52) U.S. Cl.
CPC ............ *G06V 20/20* (2022.01); *G06F 3/0481* (2013.01); *G06Q 40/025* (2013.01); *G06Q 50/163* (2013.01); *G06V 10/768* (2022.01); *G06V 30/40* (2022.01); *G06F 3/04842* (2013.01)

(58) Field of Classification Search
CPC ...... G06V 20/20; G06V 30/40; G06V 10/768; G06F 3/0481; G06F 3/04842; G06Q 40/025; G06Q 50/163
See application file for complete search history.

(56) References Cited

U.S. PATENT DOCUMENTS

| | | |
|---|---|---|
| 10,043,069 B1 | 8/2018 | Liu et al. |
| 10,319,002 B1 | 6/2019 | Cardona et al. |
| 2012/0183172 A1 | 7/2012 | Stroila |

(Continued)

OTHER PUBLICATIONS

Pokemon.com [online], "Pokemon GO: Pokemon Video Games," 2016-2018, [retrieved on Dec. 11, 2018], retrieved from: URL https://www.pokemon.com/us/pokemon-video-games/pokemon-go/, 10 pages.

*Primary Examiner* — Daniel Samwel
(74) *Attorney, Agent, or Firm* — Fish & Richardson P.C.

(57) ABSTRACT

Techniques are described for capturing an image of a document or other type of physical object, and presenting the image in a user interface (UI) with an overlay that includes context information regarding the document or other physical object in the image. An application running on a portable computing device receives an image of the document that is captured using a camera of the device. The application may perform an initial analysis to identify one or more data elements present in the document, such as certain words, phrases, paragraphs, and so forth. The data elements can be uploaded to a remote service that analyzes the data elements and returns context data which is presented as an overlay to the image of the document. The context data can then be presented in an overlay to the presented image of the physical object.

20 Claims, 5 Drawing Sheets

(51) Int. Cl.
*G06Q 50/16* (2012.01)
*G06F 3/0481* (2022.01)

(56) References Cited

U.S. PATENT DOCUMENTS

| | | |
|---|---|---|
| 2013/0329943 A1 | 12/2013 | Christopulos et al. |
| 2014/0126708 A1* | 5/2014 | Sayko ................. H04M 7/0033 379/93.01 |
| 2015/0052022 A1* | 2/2015 | Christy .............. G06Q 30/0603 705/26.63 |
| 2015/0269433 A1 | 9/2015 | Amtrup et al. |
| 2017/0193320 A1* | 7/2017 | Wilbert .................. G06V 20/62 |
| 2018/0150810 A1* | 5/2018 | Lee .................... H04N 5/23293 |
| 2018/0315127 A1* | 11/2018 | Chappell .............. G06Q 20/047 |
| 2019/0019011 A1* | 1/2019 | Ross ......................... G06T 7/70 |
| 2019/0066201 A1 | 2/2019 | Berthiaume, Jr. et al. |

* cited by examiner

IMAGE CAPTURE WITH CONTEXT DATA OVERLAY

CROSS-REFERENCE TO RELATED APPLICATIONS

This application is a continuation application of and claims priority under 35 U.S.C. § 120 to U.S. application Ser. No. 16/212,006, filed on Dec. 6, 2018, which is related to, and claims benefit of, U.S. Provisional Patent Application Ser. No. 62/596,042, titled "Image Capture With Context Data Overlay," which was filed on Dec. 7, 2017, the entire contents of each of which are incorporated herein by reference.

BACKGROUND

In the course of their daily lives, individuals may be required to read a variety of documents related to various topics and with varying degrees of complexity. Some such documents may include language that is difficult to understand for the average reader who may lack expertise in the subject matter of the document. For example, making a high value purchase, such as a home purchase, can be stressful for many individuals. Applying for and obtaining a mortgage to purchase a home is a complex process, and may be especially overwhelming for first time homebuyers. Individuals may see a property that they like, but may not know how to find a reliable real estate agent, get prequalified for a mortgage, determine what amount of mortgage they need, and/or determine which products and terms are suitable. Moreover, during the process, individuals generally need to handle many documents of different types, which can be difficult to understand. After a loan application goes into processing, the process can become even more confusing and it may be difficult for individuals to obtain status information regarding their application.

SUMMARY

Implementations of the present disclosure are generally directed to image capture and presentation with context data overlay. More specifically, implementations are directed to presenting a captured image of a document or other physical object in a user interface, with a presented overlay that includes context data regarding the document or other physical object being shown.

In general, innovative aspects of the subject matter described in this specification can be embodied in methods that include operations of: receiving at least one image of a physical document, the at least one image captured by a camera of the portable computing device; analyzing the at least one image to identify at least one data element of the physical document; communicating, over at least one network to at least one server device, the at least one data element and receiving, from the at least one server device, context data associated with the at least one data element, the context data communicated from the at least one server device over the at least one network; and displaying the at least one image with an overlay that includes at least a portion of the context data.

Implementations can optionally include one or more of the following features: the at least one server device executes a service that determines the context data based on the at least one data element; the context data includes a control that is displayed in the overlay and that is selectable to display additional information describing the at least one data element; the context data includes a control that is displayed in the overlay and that is selectable to launch a video chat session between a user of the portable computing device and a service representative; the context data includes one or more of text data, video data, and another image; the at least one data element includes a loan identifier; the context data includes information describing a status of a loan application corresponding to the loan identifier; the at least one data element is a property identifier; and/or the context data includes information describing a property corresponding to the property identifier.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. Implementations provide a context overlay that is presented with image(s) of a document or other imaged physical object in the user interface of an application. The context overlay includes context data that describes the imaged document or other object. Accordingly, by presenting context data in a ready-to-consume format along with the object being examined, implementations avoid the need for additional network requests or other processing to retrieve and present the context information, thus making more efficient use of network bandwidth, processing power, storage capacity, active memory, and/or other computing resources compared to traditional, previously available solutions. Implementations also provide an overlay within a user interface that allows users to avoid making numerous clicks and/or navigation steps to see the context data, given that various options to access help from a service representative, initiate loan applications, and/or perform other actions are presented as part of the context data in the overlay. The avoidance of extra user interface actions also avoids the expenditure of computing resources, such as those listed above. The context data can include cached and/or dynamic data elements, as appropriate. Dynamic data elements provide real time information.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for capturing an image of a document or other type of physical object, and presenting the image in a user interface (UI) with an overlay that includes context information regarding the document or other physical object in the image. In some implementations, the object is a physical document (e.g., a printed document). An application running on a portable computing device (e.g., smartphone, tablet computer, etc.) receives an image of the document that is captured using a camera of the device. The application may perform an initial analysis to identify one or more data elements present in the document, such as certain words, phrases, paragraphs, and so forth. The data elements can be uploaded to a remote service that analyzes the data elements and returns context data which is presented as an overlay to the image of the document. In some implementations, the object is some other type of physical object, such as a house or other piece of real property. The image of the object is captured and uploaded to the remote service with location data describing the location of the portable computing device that was used to capture the image. The remote service can analyze the image and the location data to generate context data regarding the physical object. The context data can then be communicated to the portable computing device for presentation in an overlay to the image of the physical object.

Figure 1:
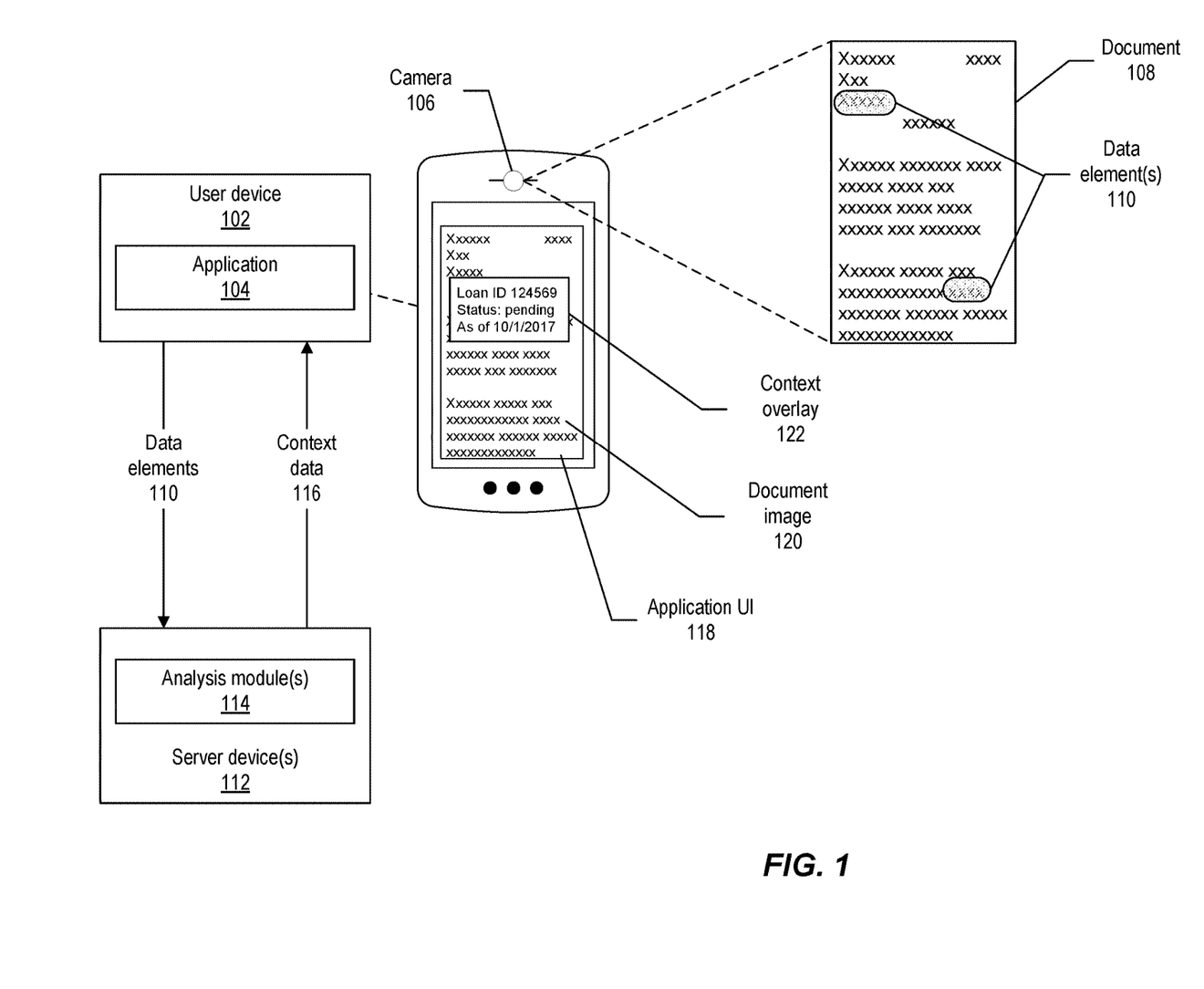
FIG. 1 depicts an example system for presenting a document image with a context data overlay, according to implementations of the present disclosure.

FIG. 1 depicts an example system for presenting a document image with a context data overlay, according to implementations of the present disclosure. A user device 102 executes an application 104. Implementations support the use of any suitable type of user device 102 that a user 102 can use to interact with the application 104. In some implementations, the application 104 may be an augmented reality and/or virtual reality application that executes on a computing device that provides an augmented reality and/or virtual reality interface. Alternatively, the user device 102 can execute an application 104 that is any other suitable type of application, such as a web application executing in a browser or other container for web content, or a mobile application (app) configured to execute on the user device 102. In some implementations, the user device 102 is a portable computing device such as a smartphone, tablet computer, wearable computer, and so forth. The user device 102 can also be a less readily portable type of computing device, such as a desktop computer, laptop computer, smart appliance, gaming console, and so forth.

The user device 102 can include one or more cameras that capture image(s) and/or video data of a field of view in proximity to the user device 102. In some instances, the camera(s) 106 may be peripheral device(s) that are connected to the user device 102 over a wired or wireless network, and are not built-in components of the user device 102. The camera(s) 106 can capture one or more image(s), and/or video data, of a physical object. In the example of FIG. 1, the imaged object is a physical document 108, such as a printed page. The image data generated by the camera(s) can include any suitable number of still image(s) and/or video data of the imaged object.

The application 104 can analyze the image data of the document 108 and determine one or more data elements 110 that are present in the document 108. Such data element(s) 108 can include text portions (e.g., alphanumeric text) of any suitable length, such as one or more characters, words, phrases, sentences, numbers, symbols, barcodes, and/or other text elements. The data element(s) 108 can also include at least a portion of one or more graphic elements and/or images that are printed onto the document 108. The document analysis can include any suitable technique for optical character recognition (OCR), optical word recognition (OWR), intelligent character recognition (ICR), intelligent word recognition (IWR), natural language processing (NLP), machine learning, parsing, and/or other techniques for identifying particular text elements or other data elements in the document 108.

The data element(s) 110 are communicated, over one or more networks, to one or more server devices 112 executing analysis module(s) 114. The server device(s) 112 can include any suitable number and type of computing device(s). In some implementations, the server device(s) 112 include distributed computing device(s) (e.g., cloud server(s)) providing a cloud computing service. The analysis module(s) 114 analyze the data element(s) 110 and determine context data 116 that is associated with the data element(s) 110. The context data 116 may be metadata and/or descriptive information that provides further context and/or information regarding the data element(s) 110. In some implementations, the context data 116 is retrieved from a table, file system, database, or other data structure that stores one or more elements of context data 116 that correspond to each of the data elements 110. The elements of context data 116 corresponding to each of the data elements 110 can be retrieved.

The context data 116 is communicated, over one or more networks, to the user device 102. The application 104 generates a context overlay 122 that includes at least a portion of the context data 116. In some implementations, the context overlay 122 is arranged such that each element of the context data 116 is presented at a position that is near or otherwise visually corresponds to the data element 110 that is associated with the context data element. Accordingly, the user viewing the context overlay 122 that is overlaid on the image of the document 108 may readily perceive that each element of the context data 116 is associated with the corresponding data element 110, providing additional context and/or descriptive information regarding the data element 110. The context overlay 122 can be presented with the document image 120 in the UI of the application 104 executing on the user device 102.

In the example of FIG. 1, the document 108 being imaged is a financial document that describes or references a loan. One of the data elements 110 extracted from the document 108 is a loan identifier (ID) such as a number or other alphanumeric text element that uniquely identifies the loan in the computing system of a financial services organization such as a bank. On receiving the loan ID, the analysis module(s) 114 can retrieve, from a database of the organization, context data 116 regarding the particular loan corresponding to the loan ID. Such context data 116 can include information regarding the status of the loan, such as whether the loan has been approved or denied, whether the loan application is currently pending and being processed for approval, or whether additional information is needed from the user to process the loan. Such context data 116 can be presented in the context overlay 122, in a position within the overlay that approximately corresponds to the position of the loan ID in the image of the document 108. The context overlay 122 can be presented along with the image of the document 108 in the UI of the application 104, to provide easy-to-access information regarding the loan identified by the loan ID. Other context data 116 in this example can include information describing various other data element(s) 110 in the document 108, such as helpful explanation of what certain terms mean or easy-to-understand description of various paragraphs or other sections within the document 108.

Other types of documents 108 can also be imaged and presented with a context overlay 122 that describes portions of the document. For example, financial documents can be presented with an overlay that includes description and/or definition of various terms and/or other text portions included in the document.

Figure 2:
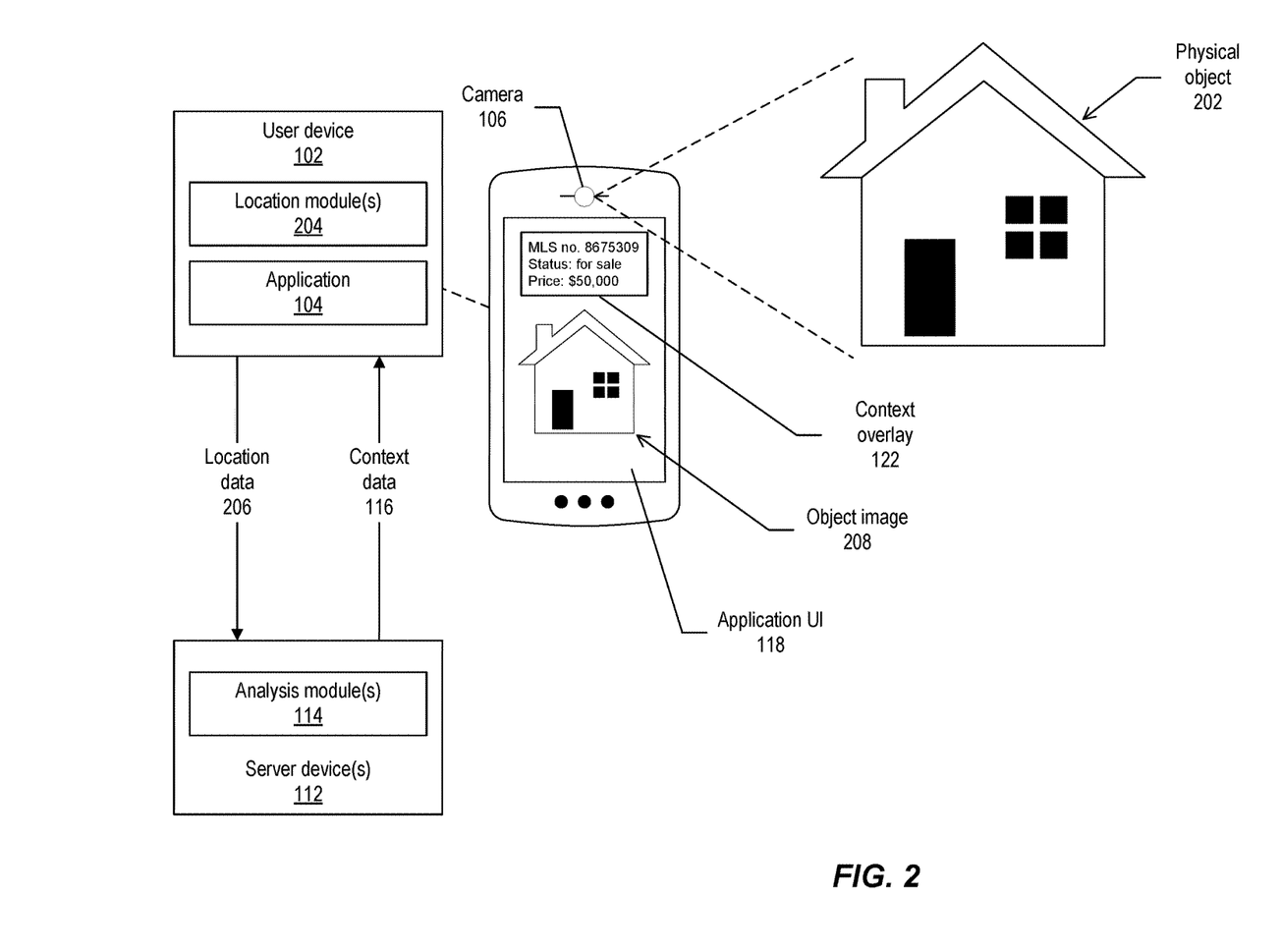
FIG. 2 depicts an example system for presenting an object image with a context data overlay, according to implementations of the present disclosure.

FIG. 2 depicts an example system for presenting an object image with a context data overlay, according to implementations of the present disclosure. In the example of FIG. 2, another type of physical object 202 is being imaged, such as a house or other piece of real property. The object image 208 of the object 202 is captured by the camera(s) 106. The user device 102 executes one or more location module(s) 204 that determine location data 206 describing a current location of the user device 102. For example, the location module(s) 204 may receive and analyze signals from a satellite-based navigation system, such as a version of the global positioning system (GPS) or other suitable system, to determine the current location of the user device 102. Other suitable techniques for location determination can also be employed.

The location data 206 can be communicated to the server device(s) 112 for analysis by the analysis module(s) 114. In some implementations, the location data 206 can include location coordinates (e.g., latitude and longitude) of the current location, or some other identification of the current location such as a street address. The location data 206 can also include orientation information describing a direction in which the camera 106 was pointing when it captured the image(s) of the object, such as the compass direction in which the camera 106 was pointing.

The analysis module(s) 114 may determine the context data 116 based on the location data 206. For example, in instances where the physical object 202 is a piece of real property, the analysis module(s) 114 can access a database that lists properties corresponding to various locations, and determine the particular piece of real property that is at the location of the user device 102 described in the location data 206, and that would be in view of the camera 106 at that location and pointed in the direction described in the location data 206. In some implementations, the user device 102 may also send the object image 208 to the server device(s) 112, and the analysis device(s) 114 may analyze the image to determine the particular piece of real property in the image. On determining the property based on the location data and/or image, the analysis module(s) 114 may retrieve context data 116 that describes the property. For example, the context data 116 may be retrieved from a database listing real estate properties for sale, such as the multiple listing service (MLS) database or similar database.

At least a portion of the context data 116 may be presented in the context overlay 122 atop the object image 208 presented in the UI of the application 104. For example, the context overlay 122 may present information regarding the property for sale, such as the asking price, identification number (e.g., MLS number), seller, seller's agent, and/or other information such as number of bedrooms, number of bathrooms, square footage, lot size, school district information, and so forth. The overlay may also present information regarding the user's loan status, such as whether the user has a mortgage approved in the amount of the property being viewed.

The home buying and mortgage application process is typically complicated, particularly for a first time home buyer who may not know how to begin the process and may require considerable assistance throughout the process. Implementations provide a tool that makes the home buying process fun and easy to navigate, with a context overlay that provides an augmented reality view on context data in addition to image(s) of the properties that a user may be interested in buying.

In some implementations, the user may be authenticated by the application and/or the server device(s) 112 prior to receiving access to the features of the application 104 for imaging objects and viewing context overlays. Such authentication can be through credentials such as username, password, personal identification number (PIN), knowledge-based question and answer (e.g., what is your favorite pet's name?), and so forth. Authentication may also be through the collection and verification of biometric data for the user, such as the user's fingerprint, retinal scan, facial recognition, voice print recognition, heart rate/pulse measurement, neural activity (e.g., brain wave scan), and so forth.

In some implementations, the application may be executing as part of a particular context, and/or the application may be configured to assist the user with particular tasks. For example, the application may be designed to help the user find a home to purchase or process a loan application, and/or the user may have navigated to a section of the application that is configured with such a purpose. The application's image capture and context overlay may be a feature that assists the user within this particular context, and that context may be used by the analysis module(s) 114 to determine the context data 116 to be presented in the overlay. For example, along with the data elements and/or location data sent to the service, the application 104 may also send an indication of what section of the application is being used when the image is captured (e.g., home purchase help section, loan application section, etc.). That indication may be employed by the analysis module(s) 114 to determine the appropriate context data 116. For example, an image captured while the user is using the home purchase help section of the application may be used to infer that the sent location data 206 corresponds to the location of a property that the user is interested in. Based on that inference, the analysis module(s) 114 can retrieve context data 116 from the corresponding MLS listing or other real property database, and send the context data 116 to the application 104. As another example, an image captured while the user is using the loan application section of the application may be used to infer that the sent data elements are extracted from a financial document that the user is reading. Based on that inference, the analysis module(s) 114 can retrieve context data 116 from the corresponding loan database or other database, and send the context data 116 to the application 104.

In some implementations, the presentation of the context overlay is based on recognizing text that is present in the document or other object being imaged. For example, the user may point their camera (e.g., of the user device) at the document, and the application can recognition a loan ID number present in the document. As another example, the application can recognize a real property ID number (e.g., MLS listing number) present in a flyer advertising the property for sale. The extracted data elements (e.g., ID number(s)) can be sent to the analysis module(s) 114, which generate context data 116 that is textual description of the item identified by the ID number, and that context data 116 is presented in the context overlay 122 atop the image of the document or other object.

Other types of context data 116 can also be presented as part of the context overlay 122 within the application 104. In some implementations, the context data includes a link, a button, or some other type of control that is selectable by the user to display additional information describing the imaged object. For example, the overlay can include a button or link that is presented over or near a data element, such as a loan ID number, in the document. When the button or link is selected, the application can present (in the overlay or elsewhere), the context data describing the status or other information regarding the loan referenced by the loan ID.

In some implementations, the context data presented in the overlay includes a control that is selectable, by the user, to launch a chat session between the user some other individual, such as a customer service representative. The chat session may be a video chat session, an audio chat session (e.g., telephone call or VOIP call), a text chat session, and so forth. During the session, the user and other individual may discuss the document or other object being imaged. For example, a loan officer of a bank may discuss a loan application with the user, or a real estate agent or mortgage specialist may discuss the imaged property with the user. In general, the context data in the overlay may include any suitable type and format of information, such as text data, video data, audio data, other image(s), graphics, dynamic selectable controls, and so forth. In some implementations, the context data may include pre-recorded snippets of video and/or audio that play in response to a command made through the application, such as video or audio that provides help regarding particular portions of an imaged document, or regarding some other type of imaged object.

In one example, the application may be used to initiate a mortgage application process. For example, the user may point their camera at a property for sale, and the application may show the context data regarding the property. The overlay may also include a control that enables the user to initiate the mortgage application process, for a loan that is at least the listed purchase price of the property as retrieved by the analysis module(s) 114. The overlay may also include a control to launch a real time chat session (e.g., video, audio, and/or text) with a loan officer or other mortgage specialist to discuss the loan application.

As another example, the user may point their camera at a flyer advertising a property for sale, and the application 104 may recognize and retrieve the property ID number (e.g., MLS number) from the flyer. The context data 116 may be generated to include information regarding the property. As another example, an image of a W2 form, pay stub, or other financial document may be analyzed to retrieve data elements, and the context data may be presented that is associated with such data elements. As another example, an image of a business card may be analysis to retrieve the name or other identifying information from the card, and the overlay can include information regarding the person identified by the card as well as a control that is selectable to launch a video or audio introduction from the person, or a real time chat session between the user and the person.

In some implementations, the presentation of the context overlay is based on an image that is captured and/or a location of the user device 102 when the image is captured. An address or otherwise described current location of the user device is recognized as being at or near a property for sale, and the context data includes retrieved information regarding that property, to be presented in the overlay with the image of the property. For example, the overlay can include context data that is at least a portion of the MLS listing for the property, along with a control that is selectable to begin the mortgage application process. In some instances, the context data is generated through a call from the server device(s) 112 to a third party service that maintains the appropriate data, such as data describing current properties for sale in an area. In some implementations, the context data 116 presented in the overlay includes publicly available data that is retrieved from a published database. The context data can also include video content such as a virtual tour of the property, a video message from the seller or seller's agent, and so forth. The context data can also include a control that enables the user to launch a real time chat session with their real estate agent, a loan officer, a customer service representative, or other individual.

In some implementations, the analysis of the document and/or object image is performed by an engine that supports text recognition, image recognition, and/or location recognition. The engine may be trained, using any suitable machine learning technique, to generate the context data 116 based on input image(s), data element(s), location information, and/or other input data. The analysis may be performed by the analysis module(s) 114 executing on the server device(s) 112 and/or by the application 104 executing on the user device 102.

Figure 3:
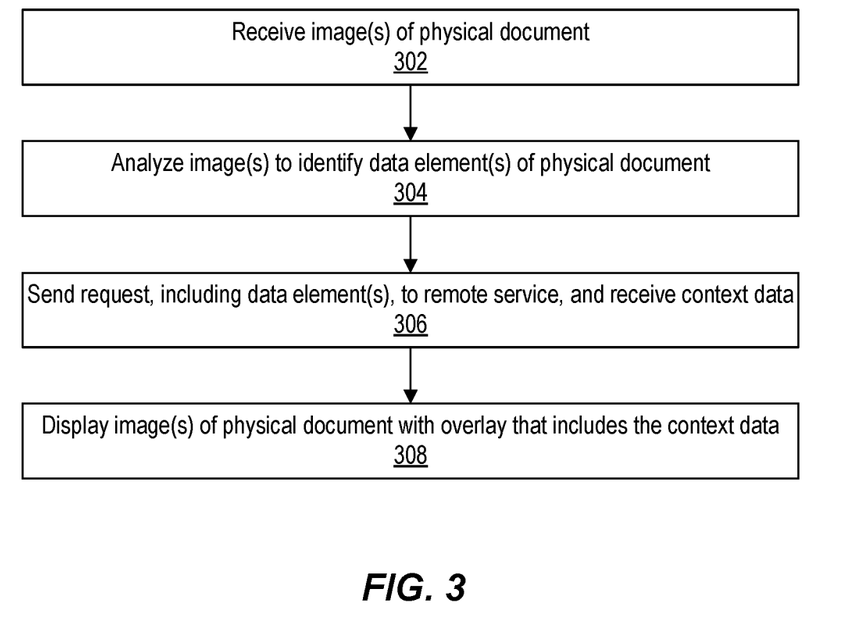
FIG. 3 depicts a flow diagram of an example process for presenting a document image with a context data overlay, according to implementations of the present disclosure.

FIG. 3 depicts a flow diagram of an example process for presenting a document image with a context data overlay, according to implementations of the present disclosure. Operations of the process can be performed by one or more of the application 104, the analysis module(s) 114, and/or other software module(s) executing on the user device 104, the server device(s) 112, or elsewhere.

Image(s) of a physical document are received (302), as described above with reference to FIG. 1. The image(s) are analyzed (304) to identify data element(s) present in the document. The data element(s) are sent (306), in a request to the remote service (e.g., the analysis module(s) 114). The context data is received in response to the request. The image(s) of the physical document are displayed (308) with the context overlay that includes the context data.

Figure 4:
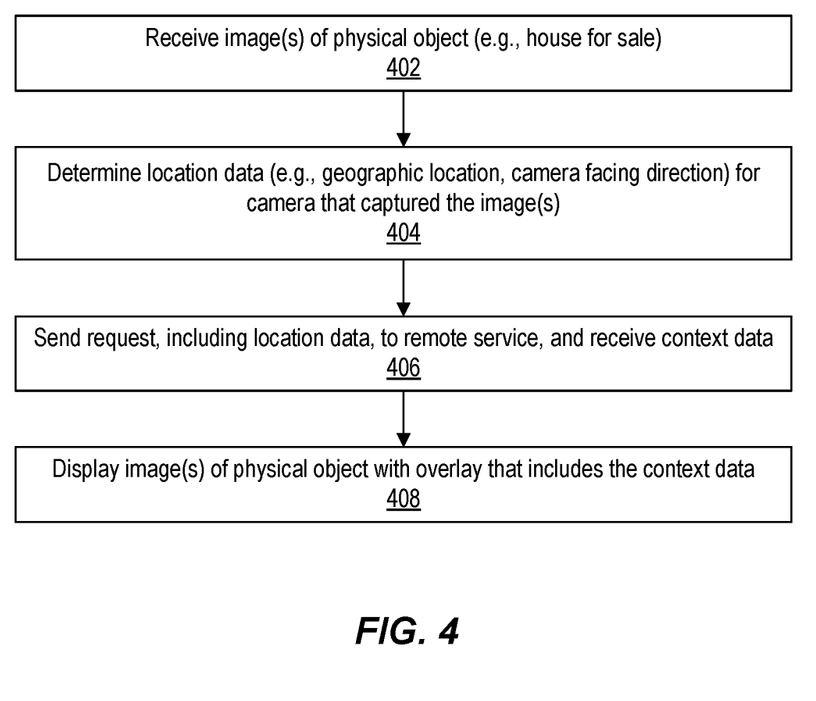
FIG. 4 depicts a flow diagram of an example process for presenting an object image with a context data overlay, according to implementations of the present disclosure.

FIG. 4 depicts a flow diagram of an example process for presenting an object image with a context data overlay, according to implementations of the present disclosure. Operations of the process can be performed by one or more of the application 104, the analysis module(s) 114, and/or other software module(s) executing on the user device 104, the server device(s) 112, or elsewhere.

Image(s) of a physical object (e.g., property) are received (402), as described above with reference to FIG. 2. The location data is determined (404) that includes a current location and/or orientation (e.g., camera direction) of the user device 102 when the image(s) were captured. The location data is sent (406), in a request to the remote service (e.g., the analysis module(s) 114). The context data is received in response to the request. The image(s) of the physical object are displayed (408) with the context overlay that includes the context data.

The context overlay can include any suitable amount of the context data presented in an appropriate manner to assist the user in understanding the imaged document or other object. For example, the overlay may be at least partly transparent, such that the document or object image is visible under the overlay while the context data is viewable with the overlay. In some instances, the context overlay may be presented at least partly to the side of the image(s) in the display.

Figure 5:
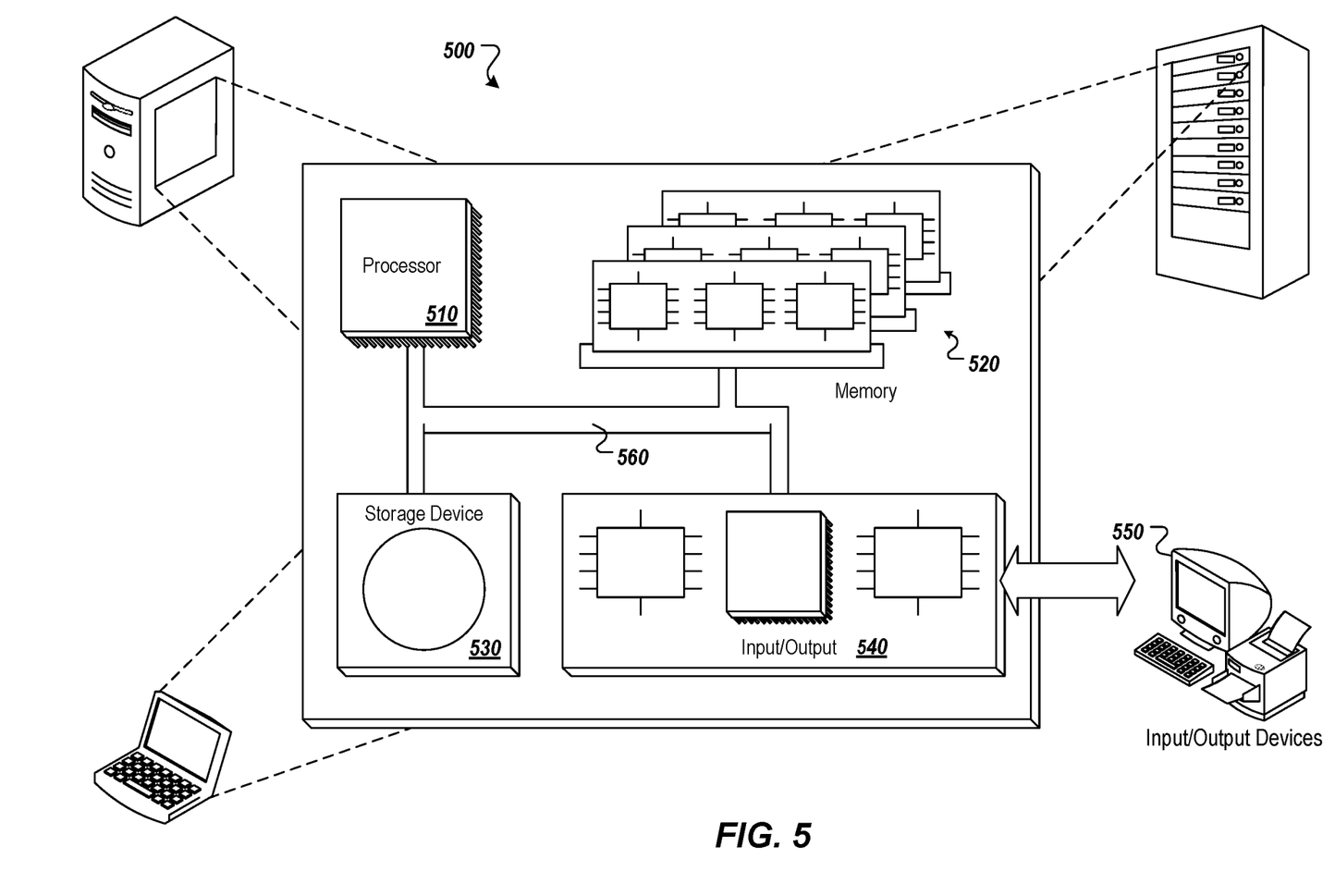
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 102, the server device(s) 112, and/or other computing device(s) or system(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may be non-transitory and may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by a portable computing device, the method comprising:
   receiving, by the portable computing device, at least one image of a physical object, the at least one image captured by a camera of the portable computing device;
   determining, by the portable computing device, location data indicating a geographical location of the portable computing device;
   communicating, by the portable computing device and over at least one network to at least one server device, the location data and an indication of a particular section of an application that was in use on the portable computing device at a time that the at least one image was captured, wherein the particular section of the application that was in use on the portable computing device at a time that the at least one image was captured is a section of the application that relates to real estate purchases; receiving, from the at least one server device, context data associated with the physical object, the context data communicated from the at least one server device over the at least one network and the context data being determined, at least in part, based on the particular section of the application that was in use on the portable computing device at a time that the at least one image was captured; and
   displaying, by the portable computing device, the at least one image with an overlay that includes at least a portion of the context data, wherein the context data includes data corresponding to a property located at the geographical location of the portable computing device.

2. The method of claim 1, wherein the at least one server device executes a service that determines the context data based on the location data and the particular section of the application that was in use on the portable computing device at a time that the at least one image was captured.

3. The method of claim 1, further comprising identifying, within the at least one image, a data element associated with the physical object.

4. The method of claim 3, further comprising communicating, by the portable computing device and over the at least one network, the data element to the at least one server device, wherein the at least one server device executes a service that determines the context data based on the data element, the location data, and the particular section of the application that was in use on the portable computing device at a time that the at least one image was captured.

5. The method of claim 3, wherein the context data includes a control that is displayed in the overlay and that is selectable to display additional information describing the data element.

6. The method of claim 1, wherein the context data includes a control that is displayed in the overlay and that is selectable to launch a video chat session between a user of the portable computing device and a service representative.

7. The method of claim 3, wherein displaying the at least one image with the overlay that includes at least a portion of the context data comprises positioning the overlay proximate to the data element that is associated with the portion of the context data.

8. The method of claim 3, wherein:
   the data element is a property identifier; and
   the context data includes information describing a property corresponding to the property identifier.

9. A system, comprising:
   at least one processor; and
   a memory communicatively coupled to the at least one processor, the memory storing instructions which, when executed by the at least one processor, cause the at least one processor to perform operations comprising:
   receiving at least one image of a physical object, the at least one image captured by a camera of a portable computing device;
   determining location data indicating a geographical location of the portable computing device;
   communicating, over at least one network to at least one server device, the location data and an indication of a particular section of an application that was in use on the portable computing device at a time that the at least one image was captured, wherein the particular section of the application that was in use on the portable computing device at a time that the at least one image was captured is a section of the application that relates to real estate purchases;
   receiving, from the at least one server device, context data associated with the physical object, the context data communicated from the at least one server device over the at least one network and the context data being determined, at least in part, based on the particular section of the application that was in use on the portable computing device at a time that the at least one image was captured; and providing, for display, the at least one image with an overlay that includes at least a portion of the context data, wherein the context data includes data corresponding to a property located at the geographical location of the portable computing device.

10. The system of claim 9, wherein the at least one server device executes a service that determines the context data based on the location data and the particular section of the application that was in use on the portable computing device at a time that the at least one image was captured.

11. The system of claim 9, further comprising identifying, within the at least one image, a data element associated with the physical object.

12. The system of claim 11, further comprising communicating, by the portable computing device and over the at least one network, the data element to the at least one server device, wherein the at least one server device executes a service that determines the context data based on the data element, the location data, and the particular section of the application that was in use on the portable computing device at a time that the at least one image was captured.

13. The system of claim 11, wherein the context data includes a control that is displayed in the overlay and that is selectable to display additional information describing the data element.

14. The system of claim 9, wherein the context data includes a control that is displayed in the overlay and that is selectable to launch a video chat session between a user of the portable computing device and a service representative.

15. The system of claim 11, wherein displaying the at least one image with the overlay that includes at least a portion of the context data comprises positioning the overlay proximate to the data element that is associated with the portion of the context data.

16. The system of claim 11, wherein:
the data element is a property identifier; and
the context data includes information describing a property corresponding to the property identifier.

17. One or more non-transitory computer-readable media storing instructions which, when executed by at least one processor, cause the at least one processor to perform operations comprising:

receiving at least one image of a physical object, the at least one image captured by a camera of a portable computing device;

determining location data indicating a geographical location of the portable computing device;

communicating, over at least one network to at least one server device, the location data and an indication of a particular section of an application that was in use on the portable computing device at a time that the at least one image was captured, wherein the particular section of the application that was in use on the portable computing device at a time that the at least one image was captured is a section of the application that relates to real estate purchases;

receiving, from the at least one server device, context data associated with the physical object, the context data communicated from the at least one server device over the at least one network and the context data being determined, at least in part, based on the particular section of the application that was in use on the portable computing device at a time that the at least one image was captured; and providing, for display, the at least one image with an overlay that includes at least a portion of the context data, wherein the context data includes data corresponding to a property located at the geographical location of the portable computing device.

18. The one or more computer-readable media of claim 17, wherein the at least one server device executes a service that determines the context data based on the location data and the particular section of the application that was in use on the portable computing device at a time that the at least one image was captured.

19. The one or more computer-readable media of claim 17, further comprising identifying, within the at least one image, a data element associated with the physical object.

20. The one or more computer-readable media of claim 19, further comprising communicating, by the portable computing device and over the at least one network, the data element to the at least one server device, wherein the at least one server device executes a service that determines the context data based on the data element, the location data, and the particular section of the application that was in use on the portable computing device at a time that the at least one image was captured.

* * * * *